July 7, 1931.  A. G. PETERS  1,813,881
ANTIGLARE SHIELD
Filed May 29, 1929
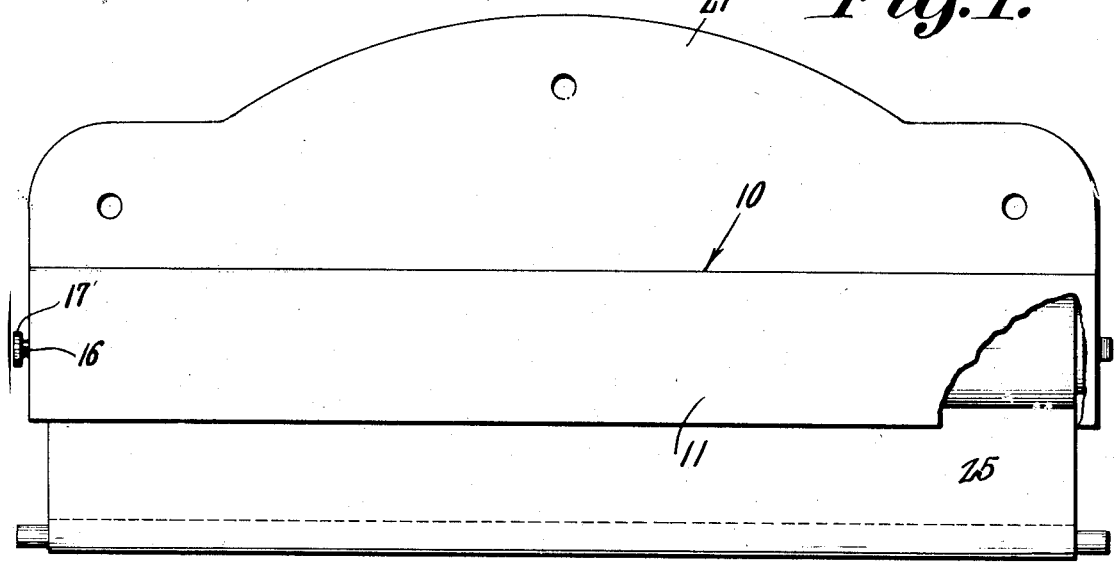
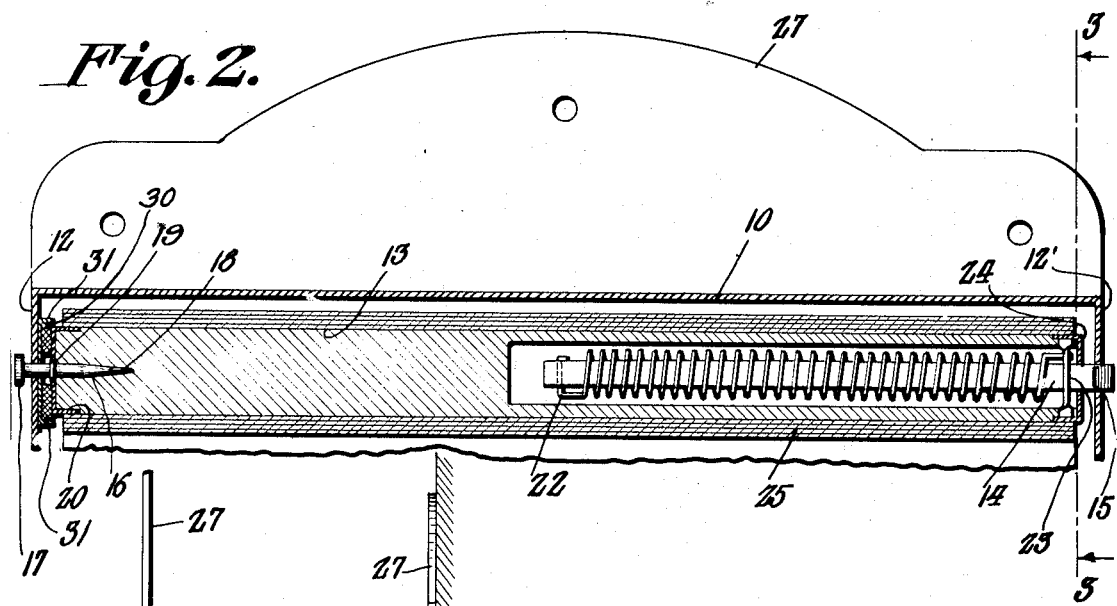
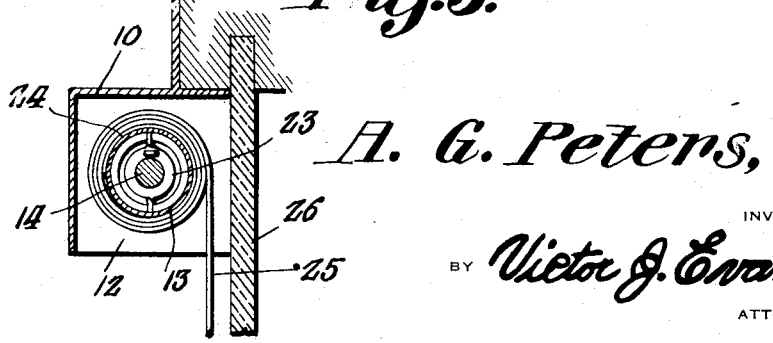
A. G. Peters,
INVENTOR
BY Victor J. Evans
ATTORNEY Patented July 7, 1931

1,813,881

UNITED STATES PATENT OFFICE

ALBERT G. PETERS, OF GERALDINE, MONTANA

ANTIGLARE SHIELD

Application filed May 29, 1929. Serial No. 367,065.

The object of this invention is to prevent headlight glare or other strong light, as for instance from the rays of the sun when low from interfering with the vision of a driver of a motor vehicle.

A further object is to provide for the accurate adjustment of the shield to any height by the use of cooperating frictional surfaces, one of which is on the end of a roller mounting the shield, and the other of which is mounted in a fixed position, this arrangement avoiding the necessity of obtaining only an approximate adjustment which is possible when ratchet mechanism is employed for mounting a spring roller for the various purposes for which it is employed.

With the foregoing and other objects in view, the invention consists in the novel construction and arrangement of elements disclosed, it being understood that modifications may be made within the scope of the claim without departing from the spirit of the invention.

In the drawings:—

Figure 1 is a view of the device in elevation.

Figure 2 is a view chiefly in vertical section, with a portion of the plate adapted to mount the housing, illustrated in elevation.

Figure 3 is a vertical section on line 3—3 of Figure 2.

Figure 4 is a view in end elevation.

A housing for a spring roller includes a top 10, a side portion 11 and end portions such as 12 and 12'. The spring roller 13 is mounted between the elements 12 and 12', the rod 14 having an end portion passing thru an aperture providing a bearing at 15.

The pin 16 is caused to enter the opposite end of the roller thru end portion 12 of the housing, and is provided with a head 17 and with a point 18 which may be thrust into the end of said element 13. A collar or flange 19 serves an obvious purpose, preventing the pin from being pushed too far in, and this portion 19 may be at the open end of the cap 20 which surrounds the end of roller 13. The spring for the roller, attached at one end at 22 to the bar 14 is also attached to element 23 which in turn is mounted within cap 24. The spring roller operates in approximately the usual manner.

An important feature of the device is found in the fact that the shield or shade of suitable flexible material, and designated 25, is in such position, due to the position of the roller, that the shield will ride directly adjacent to the surface of the glass 26 of the windshield, it being understood that the device is to be attached above the glass, in a suitable position, with reference to the position of the operator of the car.

Another important feature is found in the fact that there is frictional engagement between the cap 20 and a compressible element 30 mounted within a flanged plate or cup 31 carried by the end portion 12 of the housing.

This arrangement provides a braking action on the shield or with reference to the position thereof, so that when the correct adjustment is effected, the shield will retain its position until again adjusted, no ratchet or other holding mechanism being employed.

What is claimed is:—

An anti-glare shield comprising a casing, a curtain supporting roller located in said casing, a spring re-winding means for said roller and rotatably supporting one end of the roller to the casing, a pin secured to the other end of the roller and extending through the casing to rotatably support said roller to the casing and having a headed end disposed exteriorly of the casing, and a frictional element between the casing and the roller and mounted on the pin.

In testimony whereof I affix my signature.

ALBERT G. PETERS.